US007734374B2

(12) United States Patent
Dallman

(10) Patent No.: US 7,734,374 B2
(45) Date of Patent: Jun. 8, 2010

(54) DRUG STORAGE, INDEXING AND DISPENSING SYSTEM

(76) Inventor: Brent A. Dallman, 8947 W. 52nd St., Indianapolis, IN (US) 46234

( * ) Notice: Subject to any disclaimer, the term of this patent is extended or adjusted under 35 U.S.C. 154(b) by 683 days.

(21) Appl. No.: 11/651,121

(22) Filed: Jan. 9, 2007

(65) Prior Publication Data

US 2008/0164272 A1 Jul. 10, 2008

(51) Int. Cl.
*G06F 17/00* (2006.01)

(52) U.S. Cl. ....................... 700/242; 700/236; 206/486; 206/490; 220/23.88

(58) Field of Classification Search ................. 700/236; 206/486, 487, 488, 485.1, 490; 220/23.89, 220/23.88, 507
See application file for complete search history.

(56) References Cited

U.S. PATENT DOCUMENTS 5,048,870 A 9/1991 Margini et al.
5,239,491 A * 8/1993 Mucciacciaro .............. 700/244
5,520,307 A * 5/1996 Miller et al. .................... 221/2
7,219,800 B2 * 5/2007 Bulow ........................ 206/563
2006/0272976 A1 12/2006 Pinney et al.

FOREIGN PATENT DOCUMENTS

WO 99/30248 A 6/1999

* cited by examiner

*Primary Examiner*—Gene Crawford
*Assistant Examiner*—Timothy R Waggoner
(74) *Attorney, Agent, or Firm*—Keith J. Swedo

(57) ABSTRACT

A drug storage and dispensing system including a container for containing the drug, a storage tray and a drug identification key. The storage tray includes a plurality of drug storage chambers each defined by a sidewall and configured to receive the container. The key member includes at least one projection and at least one opening configured to receive the at least one projection. The at least one projection is disposed on either the sidewall or the container. The at least one projection receiving member is formed in the other of the sidewall and the container. The at least one projection and at least one opening have configurations that corresponding to at least one feature of the drug. The at least one projection is received in the at least one opening when the container is received in the storage chamber.

16 Claims, 13 Drawing Sheets

DRUG STORAGE, INDEXING AND DISPENSING SYSTEM

BACKGROUND

The present invention relates to drug storage and dispensing systems.

In healthcare facilities, such as hospitals, drugs are administered to patients. Such drugs are typically stored in a cabinet or closet and are categorized by drug and dosage. Some, more advanced, facilities utilize an automated drug inventory system which uses a user interfaced processor to track the drugs being stocked in and taken from the drug cabinet. Some processors employ mechanisms to restrict access to certain drugs. Despite these drug inventory systems, such drug cabinets are still stocked by humans capable of error. Furthermore, the labels on many of the drug containers and vials are small and difficult to read.

There have been numerous documented cases of drug cabinets being improperly stocked and death or injury has resulted. This may be more prone to occurring in emergency settings when caregivers must act quickly. For instance, the healthcare provider may reach into the drug cabinet and remove a vial stored in the Heparin-child dose section believing that he/she is removing the proper dose of Heparin. Unfortunately, the vial may actually be the adult dose of Heparin which was improperly stocked. Administered to a child, the adult dose may result in death. In other cases, the wrong drug altogether is placed in the drug compartment.

A need remains for a system that helps to insure that the proper drug is stocked in the proper compartment and/or that the proper drug is dispensed and administered to the patient.

SUMMARY

The present invention provides a system for storing and/or dispensing drugs. In one aspect, the present invention provides a drug storage and dispensing system for storing drugs contained in a container. In one embodiment, the storage system includes a storage tray and a drug identification key member. The storage tray includes at least one drug storage chamber defined by a sidewall and configured to receive the drug container. The drug identification key member includes at least one projection and at least one projection receiving opening configured to receive the at least one projection. The projection is disposed on either the sidewall of the storage chamber or the container, while the projection receiving opening is formed in the other of the sidewall and the container. The projection and the opening have configurations complementary to one another. The complementary configurations correspond to at least one feature of the drug. The at least one projection is received in the at least one opening when the container is received in the storage chamber.

In another aspect, the present invention provides a drug storage and dispensing system for storing drugs. The storage system includes a container for containing the drug, a storage tray and a drug identification key. The storage tray includes at least one drug storage chamber defined by a sidewall and configured to receive the container. The drug identification key member includes at least one projection and at least one projection receiving opening configured to receive the at least one projection. The projection is disposed on either the sidewall or the container. The opening is formed in the other of the sidewall and the container. The at least one projection and at least one opening have configurations that corresponding to at least one feature of the drug. The at least one projection is received in the at least one opening when the container is received in the storage chamber.

In another aspect the drug storage and dispensing system for storing drugs contained in a container includes a storage tray including a plurality of drug storage chambers. Each of the drug storage chambers are defined by a sidewall and configured to receive the drug container. The storage and dispensing system also includes a drug identification key member including at least one projection adapted to extend from the container. The storage and dispensing system also includes a drug identification key receiving member including at least one opening formed in the sidewall of the drug storage chambers and configured to receive the at least one projection. The at least one projection and at least one opening have configurations complementary to one another. The complementary configurations correspond to at least one feature of the drug. The at least one projection is received in the at least one opening when the container is received in the storage chamber.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
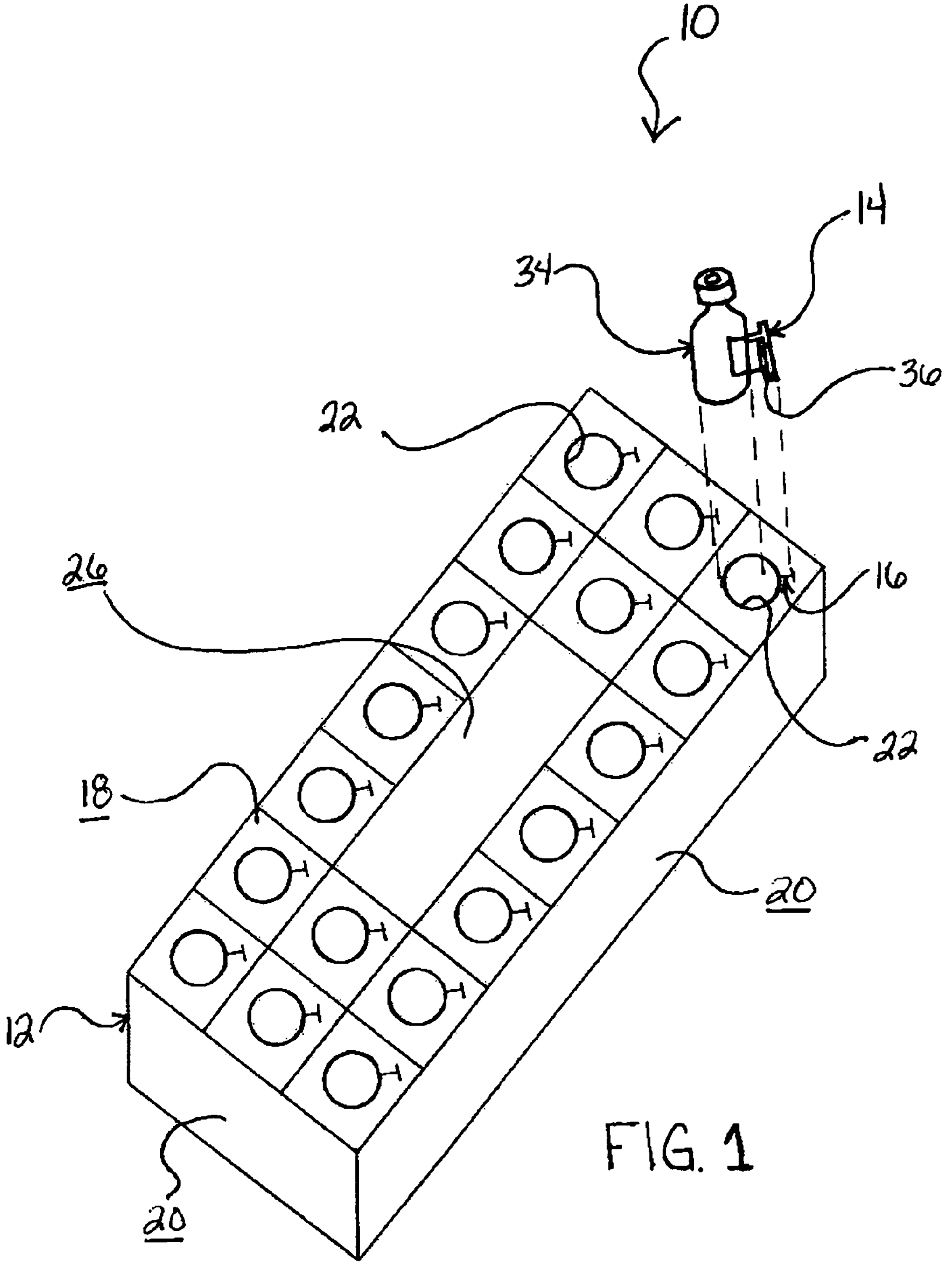
FIG. 1 is a perspective view of a drug storage and dispensing system in accordance with one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 2:
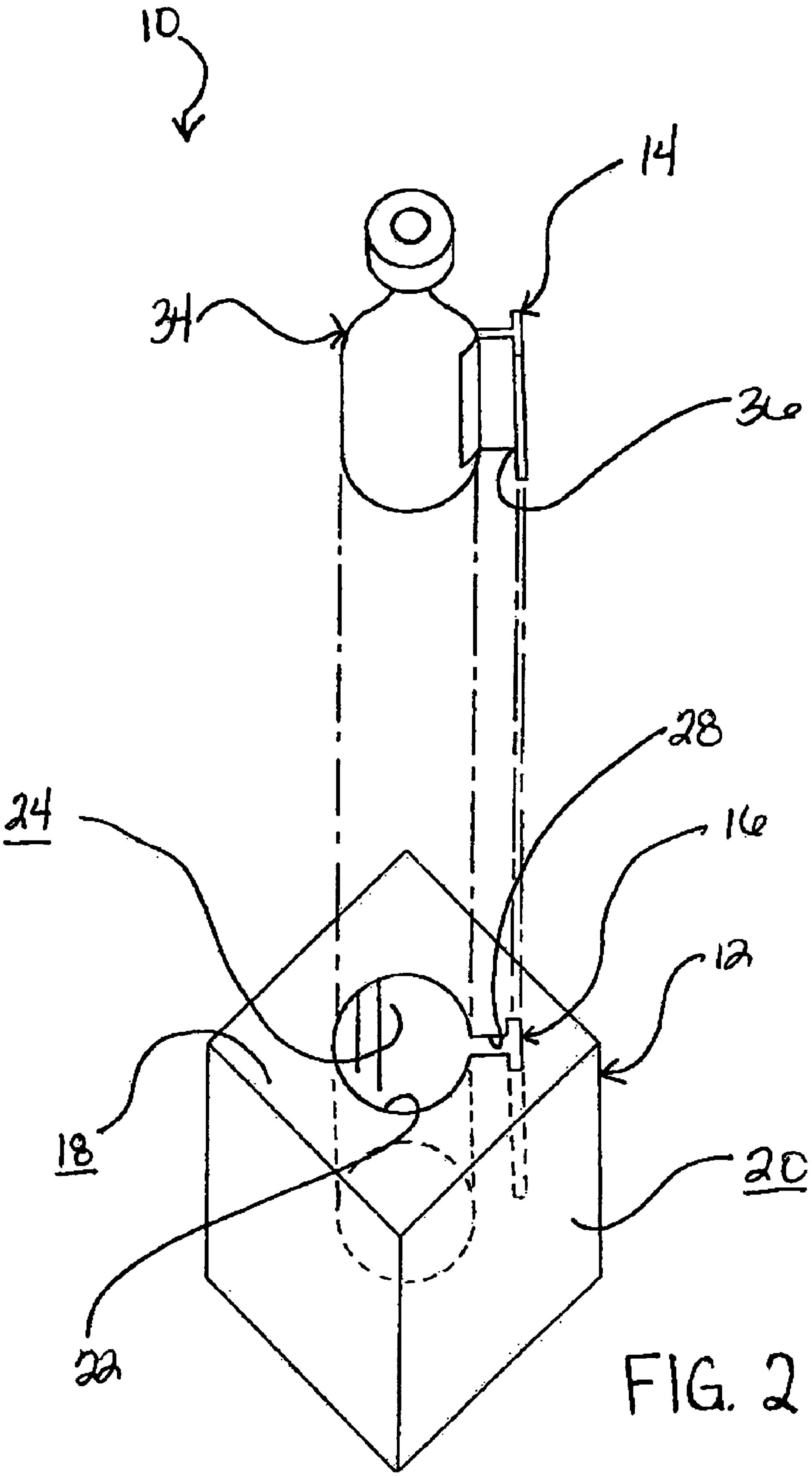
FIG. 2 is an exploded partial view of the drug storage and dispensing system of FIG. 1.

Referring first to FIGS. 1 and 2, drug storage and dispensing system 10, in accordance with one embodiment of the present invention will now be described. Drug storage and dispensing system 10 generally includes storage tray 12 and drug identification key, which includes drug identification key member 14 and drug identification key receiving member 16. Storage tray 12 is defined by top surface 18, opposing bottom surface (not shown) and side surfaces 20 extending between top and bottom surfaces.

Storage tray 12 also includes a plurality of drug storage chambers 22 extending therein from top surface 18. Drug storage chambers 22 are configured to receive at least a portion of a drug container, such as drug container 34, which is in the form of a vial. Drug storage chambers 22 may have any shape or form and may be configured to receive other forms and shapes of drug containers including, for example, prefilled syringes, pill bottles, pill packets and other drug containers. Drug storage chambers 22 are defined by sidewall 24. For purposes of this application, sidewall 24 is intended to include not only the cylindrical side sidewall, but any and all walls forming the chamber, including the bottom sidewall. Storage tray 12 may also include label surface 26 for receiving a label identifying the drugs to be stored in tray 12. As illustrated in FIG. 1, storage tray may have a rectangular shape and may be designed to fit into a drug cabinet or drawer, as is further illustrated and discussed below. However, although storage tray 12 is illustrated as having any a rectangular shape and multiple drug storage chambers 22, storage tray 12 may have any shape and any number of storage chambers 22.

Figure 5:
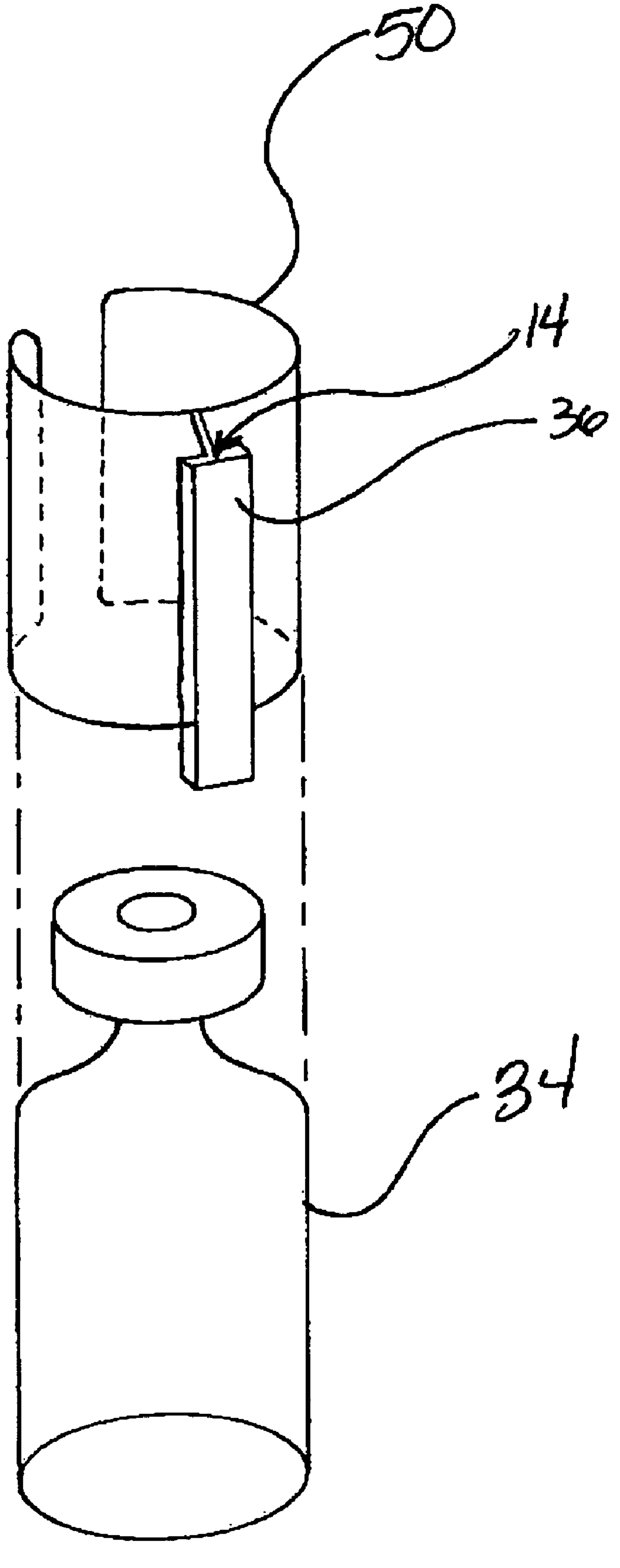
FIG. 5 is a perspective view of a container and key member in accordance with one embodiment of the present invention.

Drug identification key member 14 is mounted to drug container 34 and includes T-shaped projection 36 projecting from the side of drug container 34. Key member 14 may be formed integrally as one unit with drug container 34. In other words, drug container 34 may be manufactured to include key projection 36. Alternatively, key member 14 may be formed separately from drug container 34 and may be affixed to drug container 34 using any known connection means including adhesive, welding or mating connectors. For example, as shown in FIG. 5, key member 14 may include sleeve 50 and projection 36 may extend from sleeve 50. Sleeve 50 slides onto and extends about drug container 34 to thereby attach projection 36 to container 34. This may accomplished at the drug manufacturing stage when vials 34 are filled with a drug, the vial may then be fitted with a corresponding projection 36. Sleeve 50 may be in the form of or include the label for the drug container 34 and may include pertinent drug information.

As illustrated in FIG. 2, drug identification key receiving member 16 includes T-shaped key receiving opening 28 formed in sidewall 24 of drug storage chamber 22. Key receiving opening 28 and key projection 36 have complementary configurations such that key receiving opening 28 is configured to mate with or receive key projection 36. The complementary configurations of key member opening 28 and key projection 36 are designed to correspond to and identify particular features of the drug to be stored in storage tray 12.

In use, storage trays 12 may be placed on storage shelves in drug cabinets, mounted on walls in drug closets, or arranged in any suitable manner in the drug storage area of a healthcare facility. Drug containers 34 and storage trays 12 are equipped with mating drug identification keys that assist one in the storage, identification and dispensing of drugs. For instance, complementary configurations of opening 28 and projection 36 are designed to correspond to a particular feature of the drug. For example, the T-shaped configurations of projection receiving opening 28 and projection 36 may correspond to the drug composition Heparin. Accordingly, all drug containers 34 containing the drug Heparin are equipped with T-shaped projection 36, which identifies the drug within container 34 as Heparin. All drug containers containing other drugs, would be equipped with a projection having a different shape incapable of being received within T-shaped opening 28. Label surface 26 of tray 12 may include a label identifying tray 12 as a Heparin storage tray. As shown in FIG. 1, because each of storage chambers 22 is equipped with T-shaped projection receiving openings 28, tray 12 is configured to receive only drug containers 34 containing Heparin. That is, only drug containers 34 containing Heparin may be inserted into storage chambers 22 and, thereby, stored in tray 12. Thus, when drug cabinets are stocked, drug containers may not be improperly placed in the wrong drug tray, thereby, minimizing the chances that the wrong drug will be dispersed.

Storage trays 12 and keys (projections 36 and key receiving openings 28) may be formed of any rigid material capable of holding drug containers and forming a mating coupling. For instance, storage trays and keys may be formed of rigid plastic, metal, wood and/or combination thereof. Trays and key may be formed by any means including extrusion, molding, machining or other means.

Figure 3:
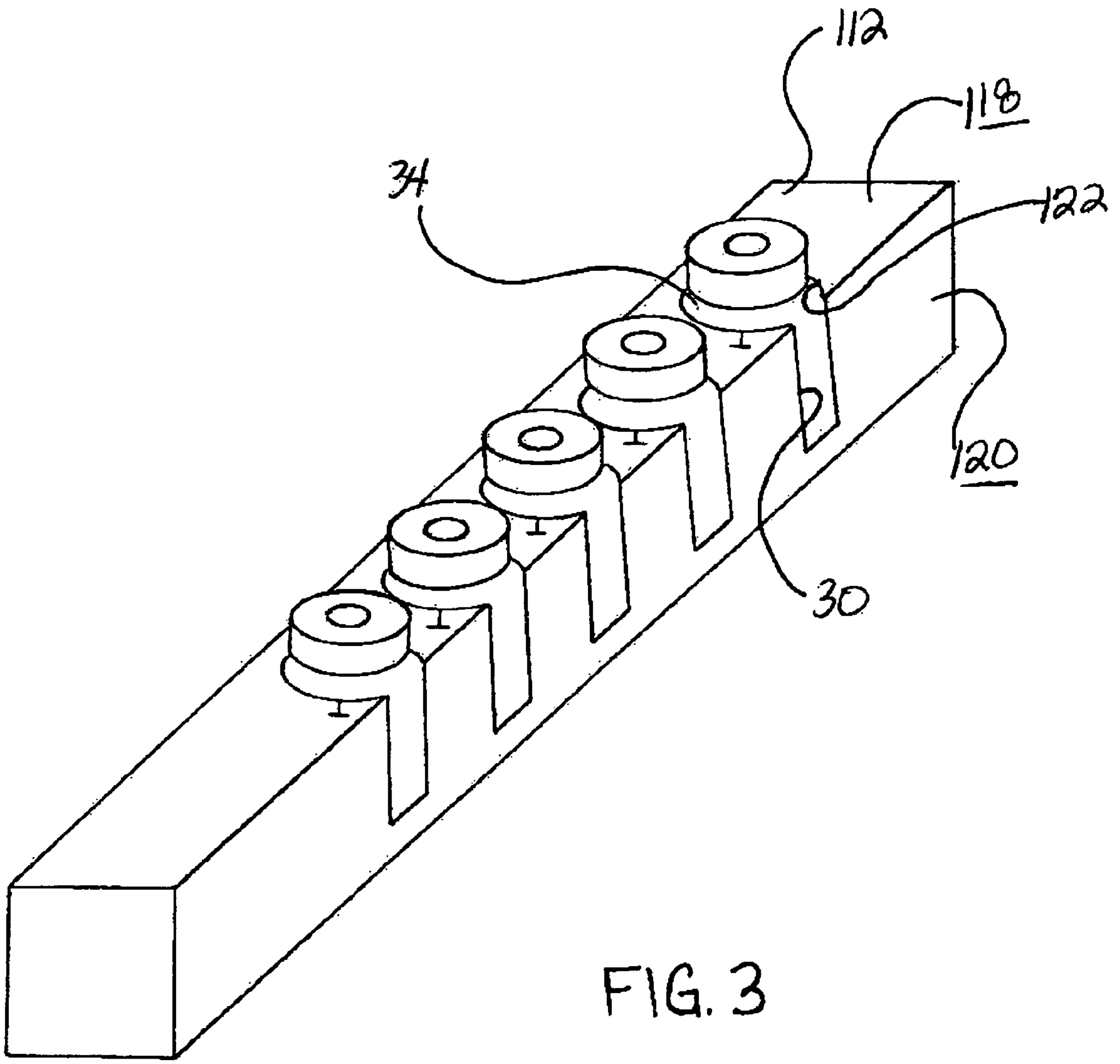
FIG. 3 is a perspective view of a drug storage and dispensing system in accordance with another embodiment of the present invention.

Turning now to FIG. 3, as mentioned above, the storage tray may have any shape and any number of storage chambers. For instance, storage tray 112 is elongated and includes a single row of drug storage chambers 122. Storage tray 112 may be suitable for placement in a storage drawer. Storage tray 112 also includes slots 30 extending through side surface 120 and intersecting storage chambers 122, such that a portion of drug container 34 may be viewed through slot 30. In this configuration, the label of drug container 34 may be viewed through slot 30.

Figure 4A:
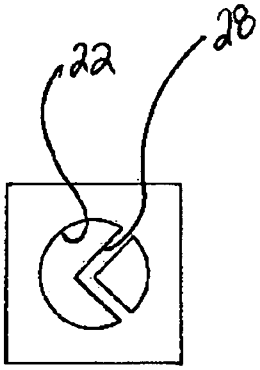
FIGS. 4A-4L are top views of alternative embodiments for the component of the drug storage and dispensing unit shown in FIG. 1A.
Figure 4B:
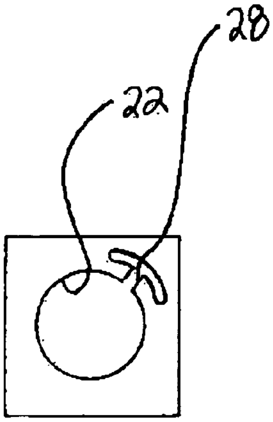
Figure 4C:
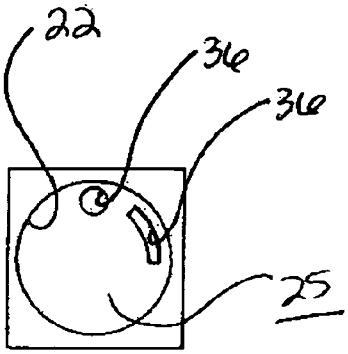
Figure 4D:
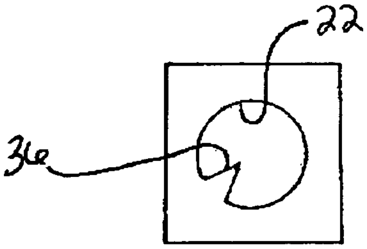
Figure 4E:
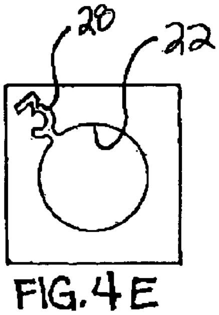
Figure 4F:
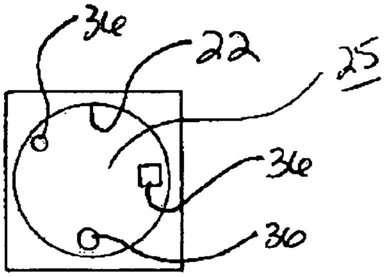
Figure 4G:
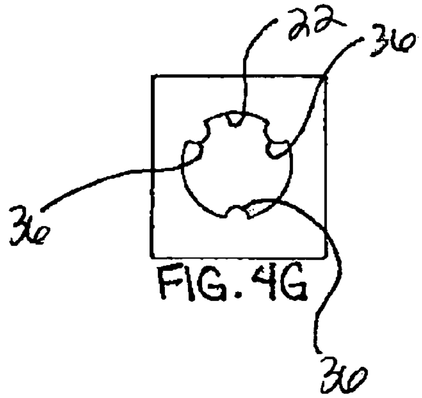
Figure 4H:
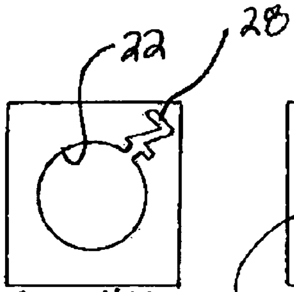
Figure 4I:
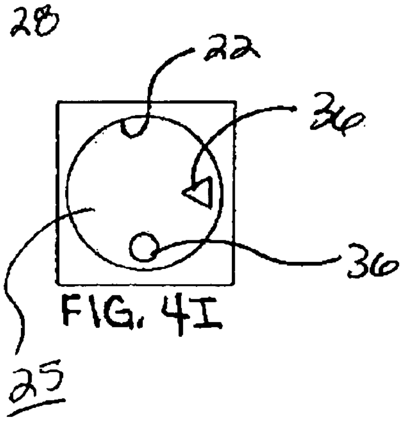
Figure 4J:
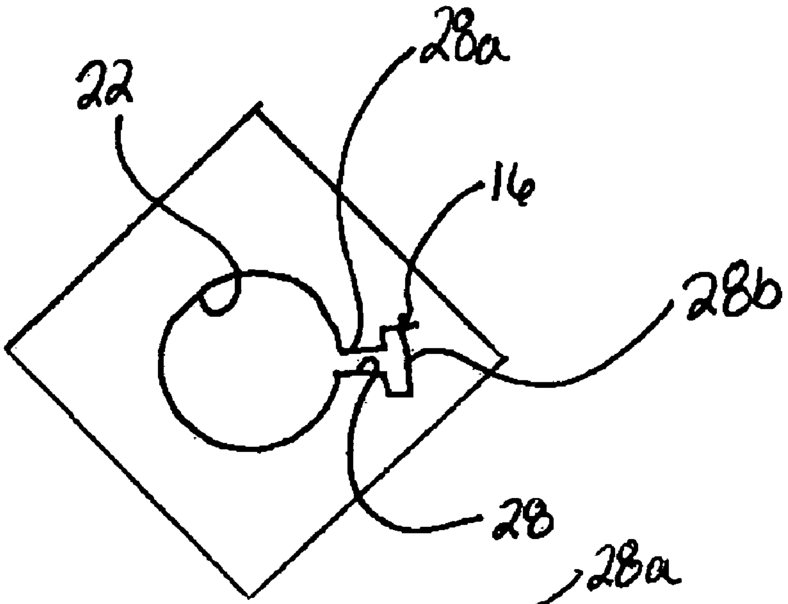
Figure 4K:
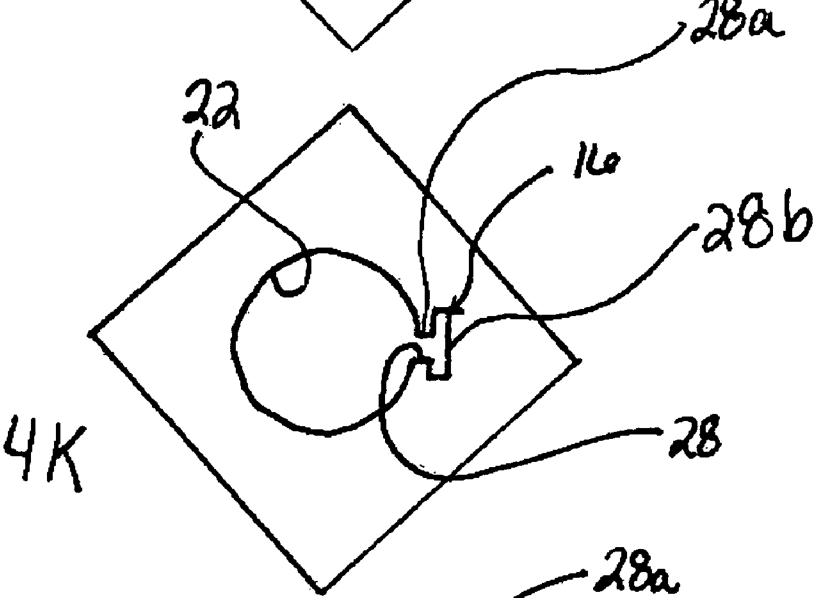
Figure 4L:
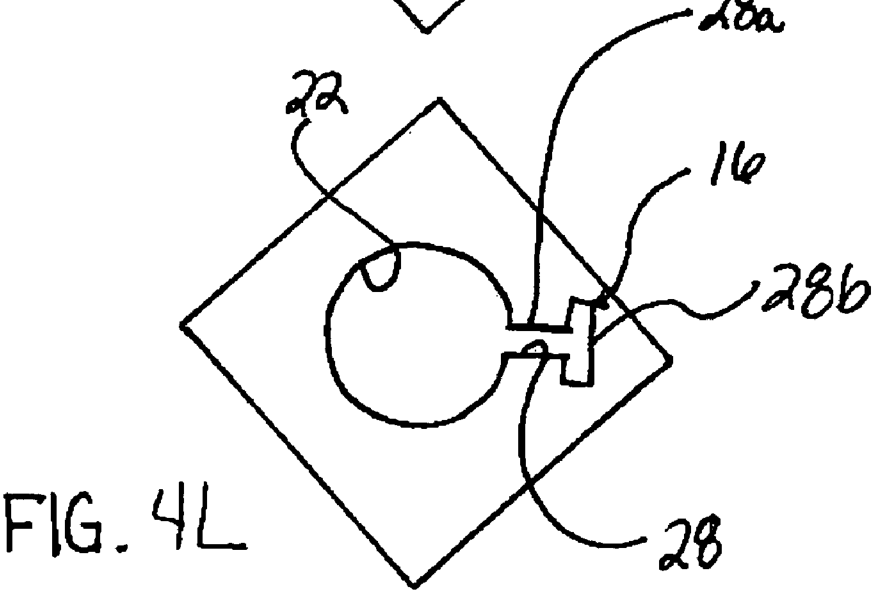

Referring now to FIGS. 4A-4L, projection 36 and projection receiving opening 28 may have a variety of different shapes. Several alternative configurations for projection receiving opening 28 are illustrated in FIGS. 4A-4B, 4E, 4H and 4J-L. Although not shown, the drug container would be equipped with projections complementary to receiving openings 28 in FIGS. 4A-4B, 4E, 4H and 4J-L. Each of the configurations shown in FIGS. 4A-4B, 4E, 4H and 4J-L may relate to a different drug composition. In fact, the receiving openings 28 of FIGS. 4J-4L may correspond to multiple features of the drug. More specifically, openings 28 have a T-shape, which may correspond to the drug composition Heparin. Each of T-shaped openings 28 includes stem portion 28*a* and cross portion 28*b*. Note that stem portion 28*a* of FIG. 4K is shorter than stem portion 28*a* of both FIGS. 4J and 4L, and that stem portion 28*a* of FIG. 4L is longer than stem portion 28*a* of both FIGS. 4J and 4K. The length of stem portion 28*a* may correspond to the drug dosage. While the T-shape may correspond to the drug composition Heparin, stem portion 28*a* of FIGS. 4J-4L may correspond to 1000 units/mL, 5000 units/mL, and 10,000 units/mL doses, respectively, of Heparin. Accordingly, a storage tray having drug storage chambers 22 with projection receiving openings 28 having the configuration of FIG. 4J would only accept drug containers having projections with a complementary configuration and only drug containers containing 1000 units/mL of Heparin would have such a projection. Therefore, only drug containers containing 1000 units/mL of Heparin can be stored in such a tray.

Furthermore, although FIGS. 1-3 illustrate projection 36 as extending from container 34 and opening 28 as being formed in chamber 22, projection 36 and opening 28 may be formed on either of container 34 and chamber 22. For example, as illustrated in FIGS. 4C-4D, 4F-4G and 4I, storage chambers 22 may include projection 36 extending into chamber 22 from the sidewall of storage chamber. The drug vial (not shown) to be stored in the chamber 22 of FIGS. 4C-4D, 4F-4G and 4I would have a complementary opening for receiving the projections in FIGS. 4C-4D, 4F-4G and 4I. As shown in FIGS. 4C, 4F and 4I, projections 36 may be in the form of rods projecting from the bottom sidewall 25 of chamber 22. Furthermore, as shown in FIGS. 4C, 4F, 4G and 4I multiple projections 36 and/or openings 36 may be used to further identify features of the drug.

Figure 6:
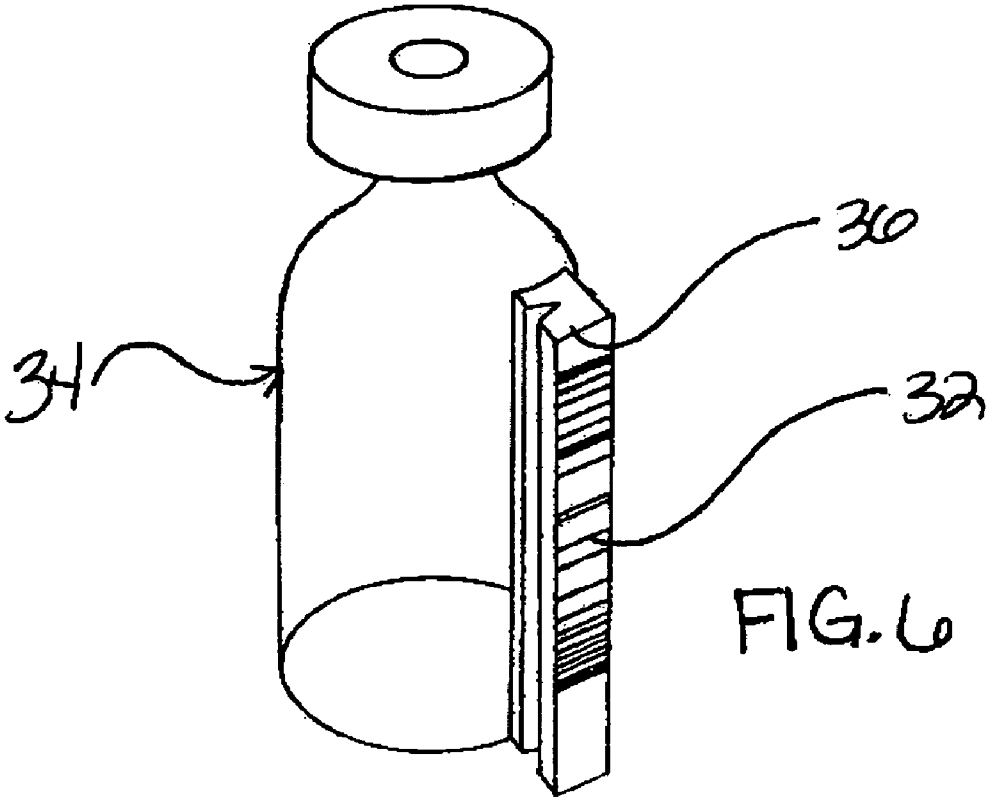
FIG. 6 is a perspective view of a container and key member in accordance with yet another embodiment of the present invention.
Figure 6A:
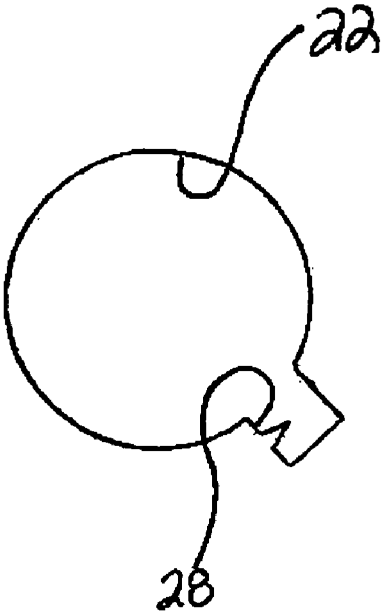
FIG. 6*a* is a top view of a key receiving member in accordance with the embodiment of FIG. 6.

Turning now to FIGS. 6 and 6A, yet another configuration of projection 36 and projection receiving opening 28 is illustrated. Further, projection 36 may also include barcode surface 32. Barcode surface 32 is adapted to be imprinted with a barcode, which may be utilized in an automated drug dispensing system and/or automated drug inventory system. The barcode may be embossed directly on barcode surface 32 or may be incorporated on a sticker, which is placed on surface 32.

Figure 7:
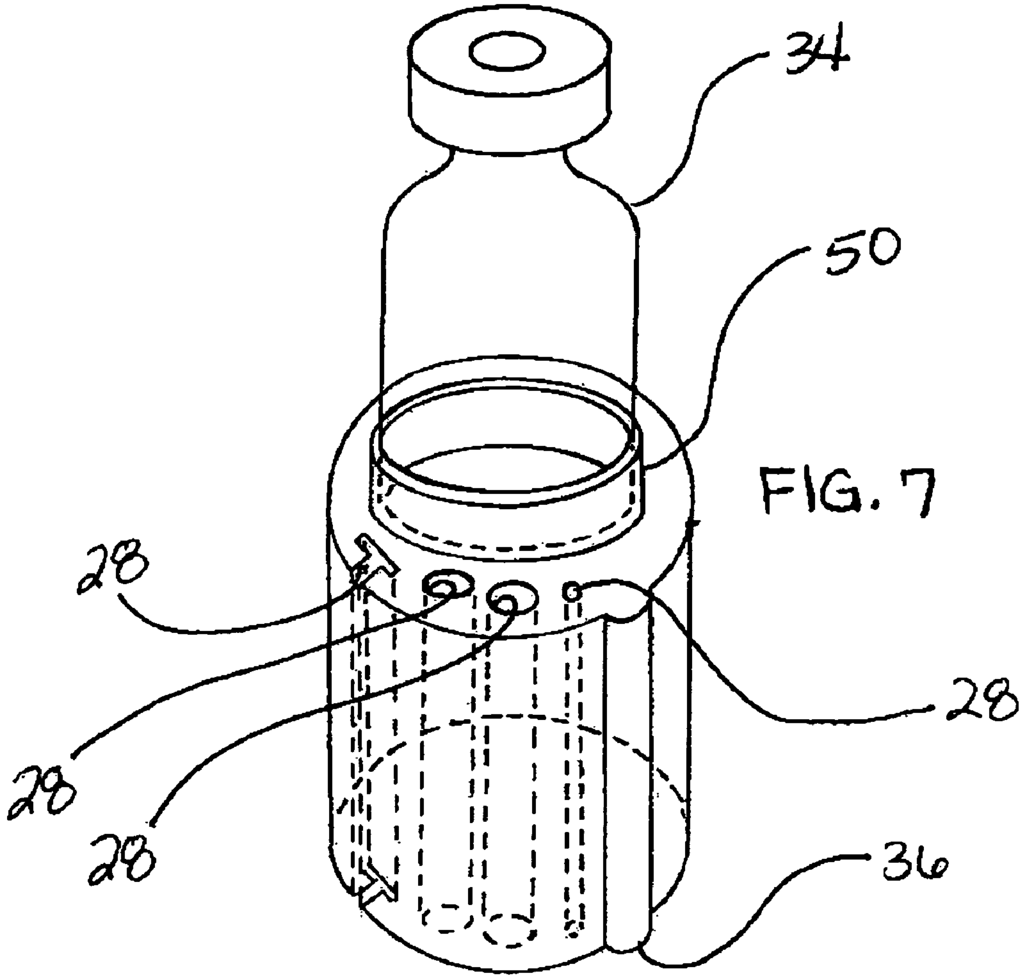
FIG. 7 is a perspective view of a container and key member in accordance with another embodiment of the present invention.
Figure 7A:
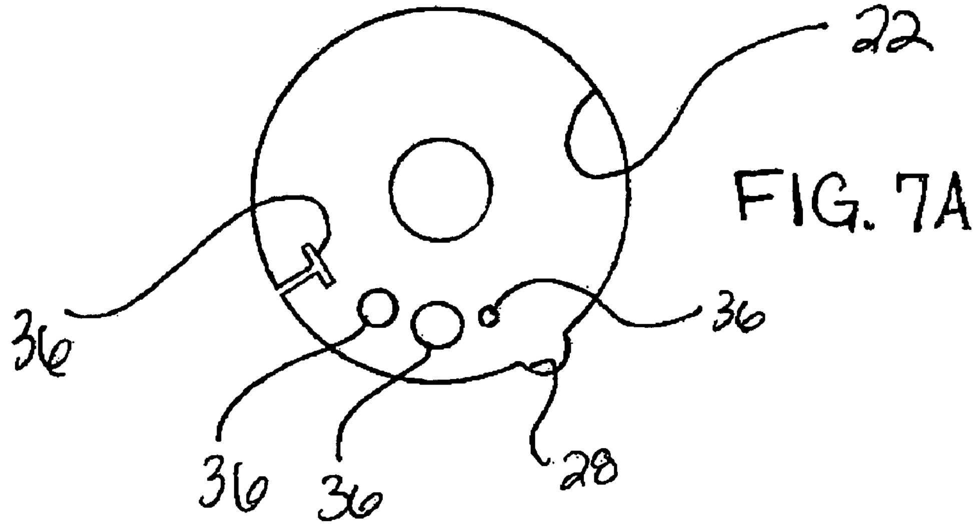
FIG. 7*a* is a top view of a storage chamber in accordance with the embodiment of FIG. 7.
Figure 11:
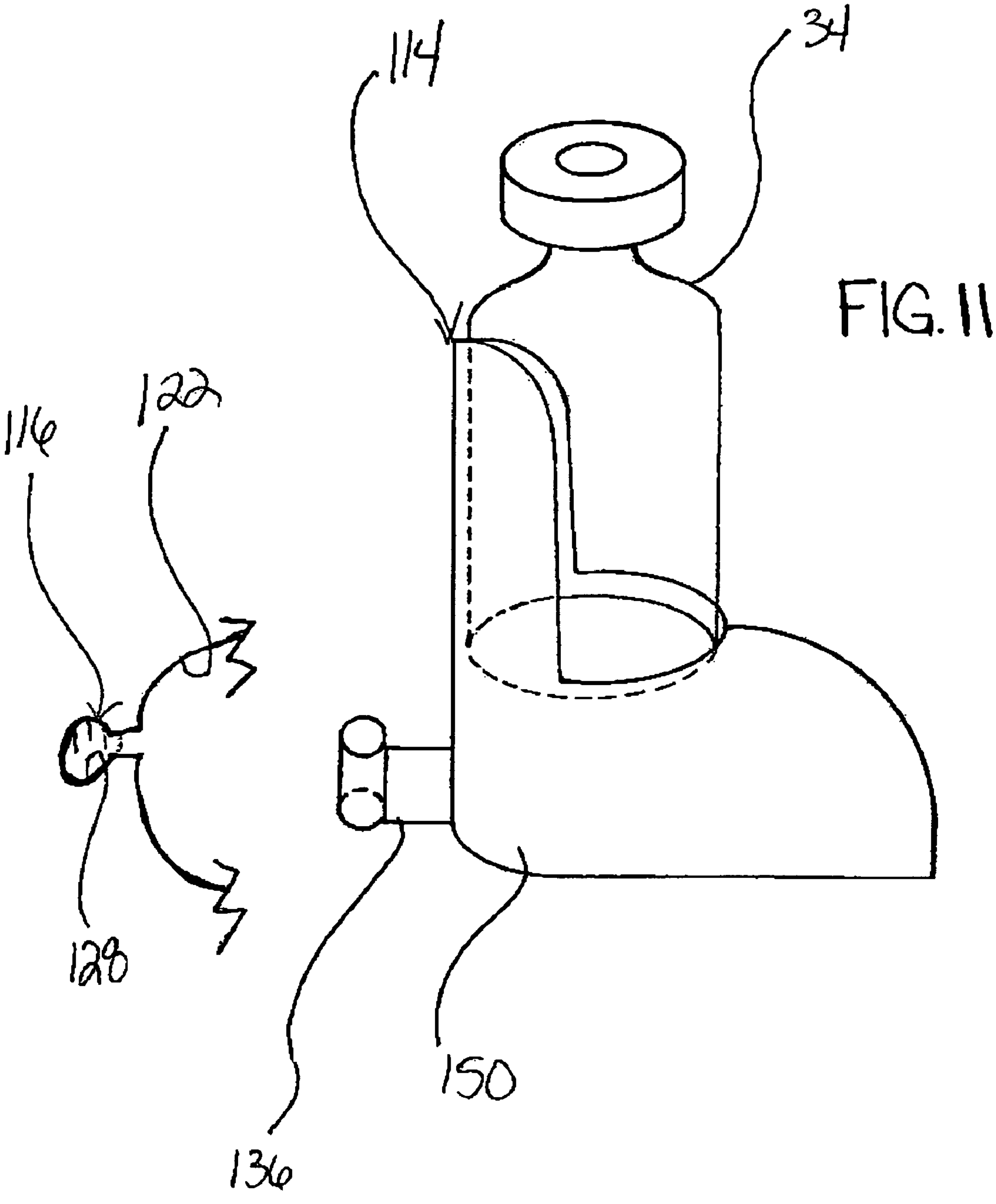
FIG. 11 is a side view of a key member of a drug storage and dispensing system in accordance with one embodiment of the present invention.

As illustrated in FIGS. 7 and 7A, projections 36 may be formed in both the wall of storage chamber 22 and in sleeve 50 of drug container 34. Correspondingly, projection receiving openings 28 may also be formed in both the wall of storage chamber 22 and in sleeve 50. FIG. 11 shows yet another embodiment of projection 136 and projection receiving opening 116. Projection 136 is mounted on vial 34 vial sleeve 150. Projection 136 is received within opening 116 defined in storage chamber 122.

Figure 8:
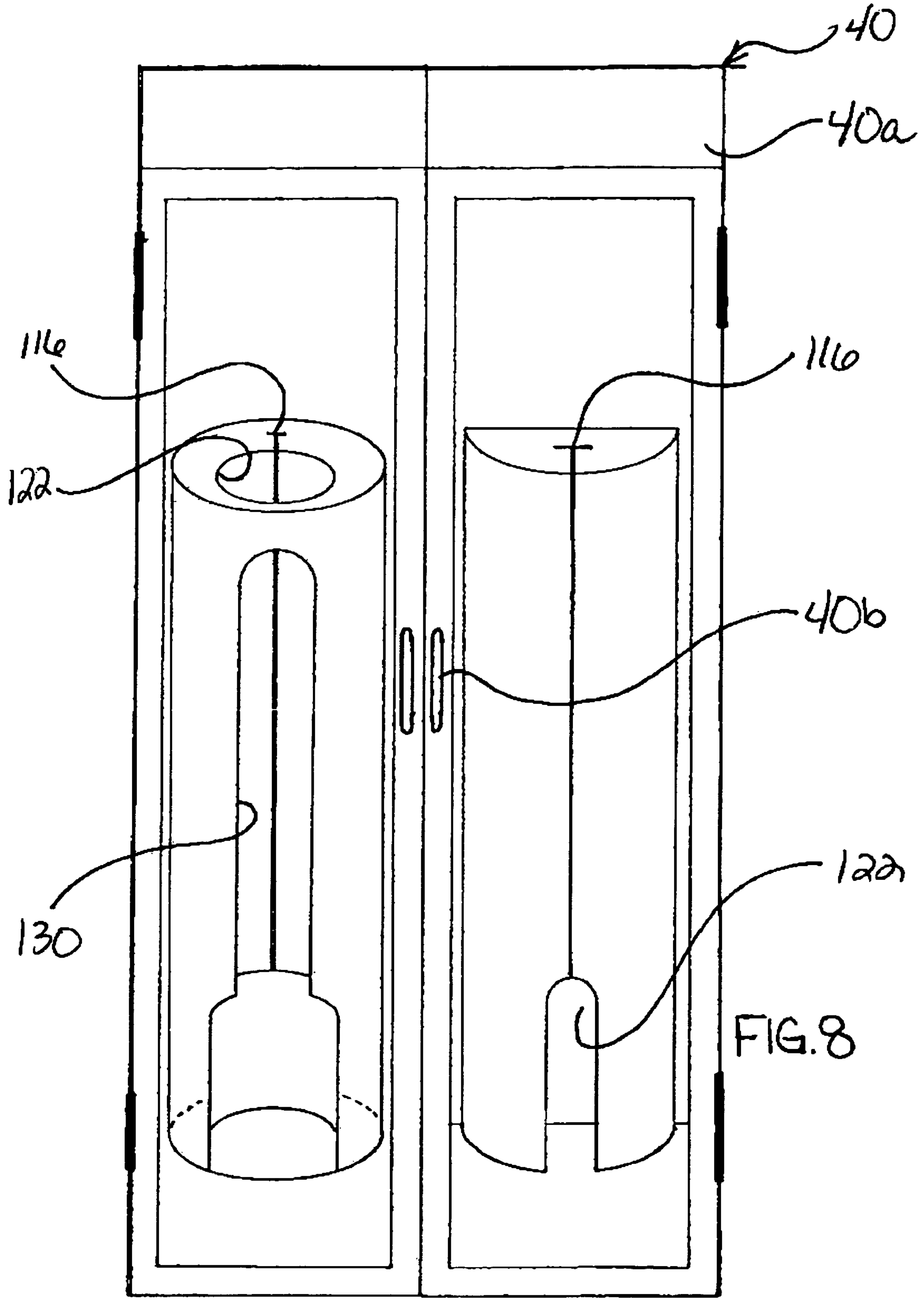
FIG. 8 is a perspective view of a component of a drug storage and dispensing system in accordance with another embodiment of the present invention.

Turning now to FIG. 8, the drug storage and dispensing system of the present invention may also include drug cabinet 40. Drug cabinet 40 contains vertically arranged drug storage chambers 122 each adapted to receive multiple drug vials. Because storage chambers 22 are configured to store multiple drug vials in a stack arrangement, storage chambers dispense the oldest vial first. Storage chambers 122 include T-shaped projection receiving opening 116 adapted to receive a T-shaped projection, such as projection 36 in FIGS. 1 and 2. Drug cabinet 40 is enclosed by door 40*a*, which includes handle 40*b*. Door 40*a* may include a lock (not shown) to restrict access. The drug storage and dispensing system of the present invention may also include and/or be used with a computer tracking system which tracks inventory and controls user access, such as the Pyxis automated dispensing system available from CardinalHealth of San Diego, Calif. The computer tracking system includes a processor (not shown) which is adapted to receive information. The processor may be electronically coupled to drug cabinet 40 and, in particular, the locking mechanism of door 40*a*. Processor may direct the unlocking of door 40*a* only after certain is received. In other words, a user must enter into the processor their user identification and password, patient information, ordering doctor information and drug request. The processor then selectively unlocks door 40*a* to that portion of the cabinet containing the requested drug.

Access to the drugs may be further restricted by equipping projections 36 and projection openings 28 with known complementary magnetic locks, which may be activated and de-activated by the processor. In this embodiment, projections 36, openings 28 and chambers 122 cooperate to insure that drug cabinet 40 is properly stocked and the proper drug and dosage are stored in the proper compartments. Magnetic locks of projections 36 and openings 28 lock the drug container in the chamber until the processor deactivates the locks upon receiving the proper information.

Figure 9:
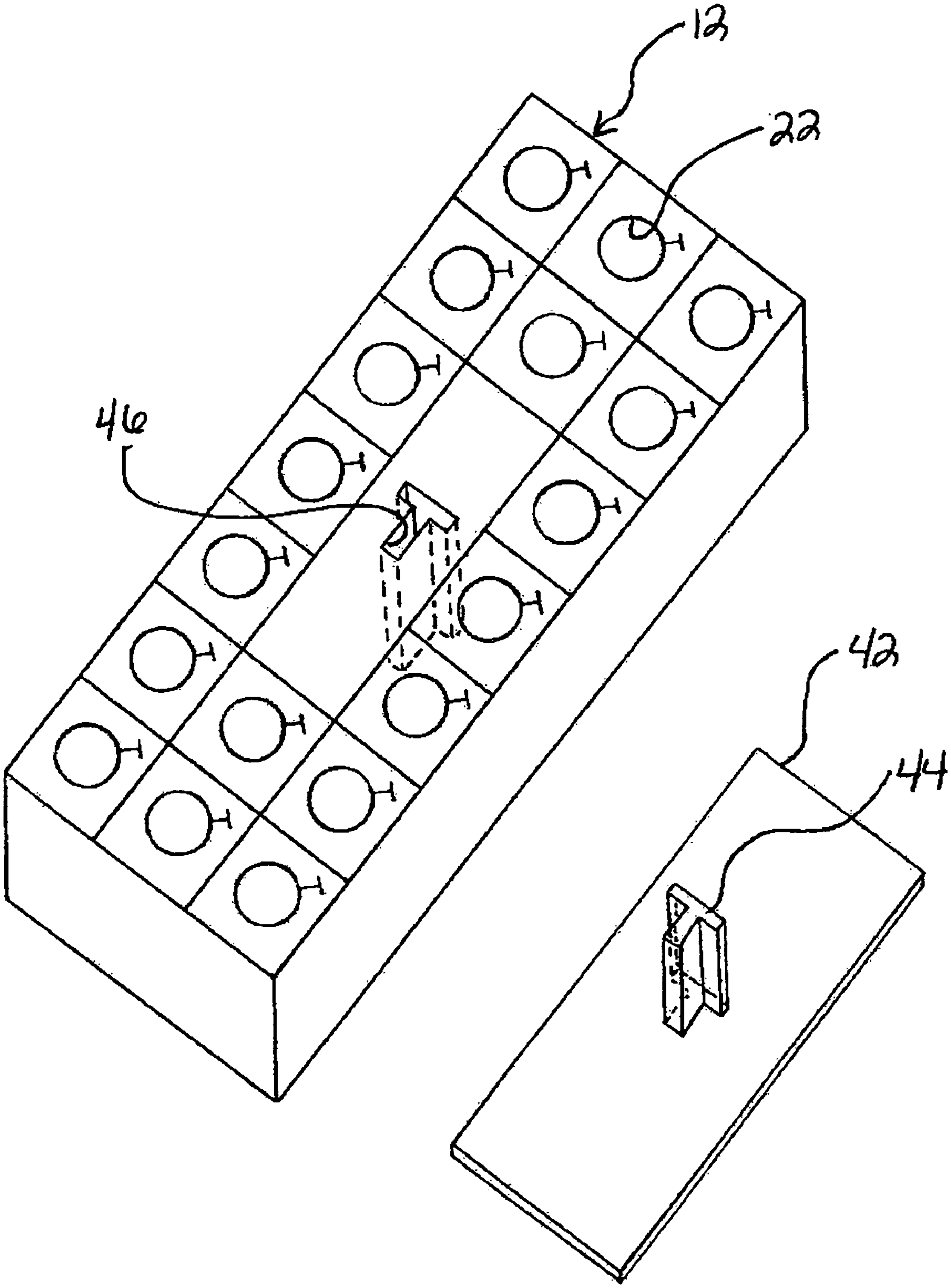
FIG. 9 is a perspective view of a tray and mounting plate of a drug storage and dispensing system in accordance with one embodiment of the present invention.
Figure 9A:
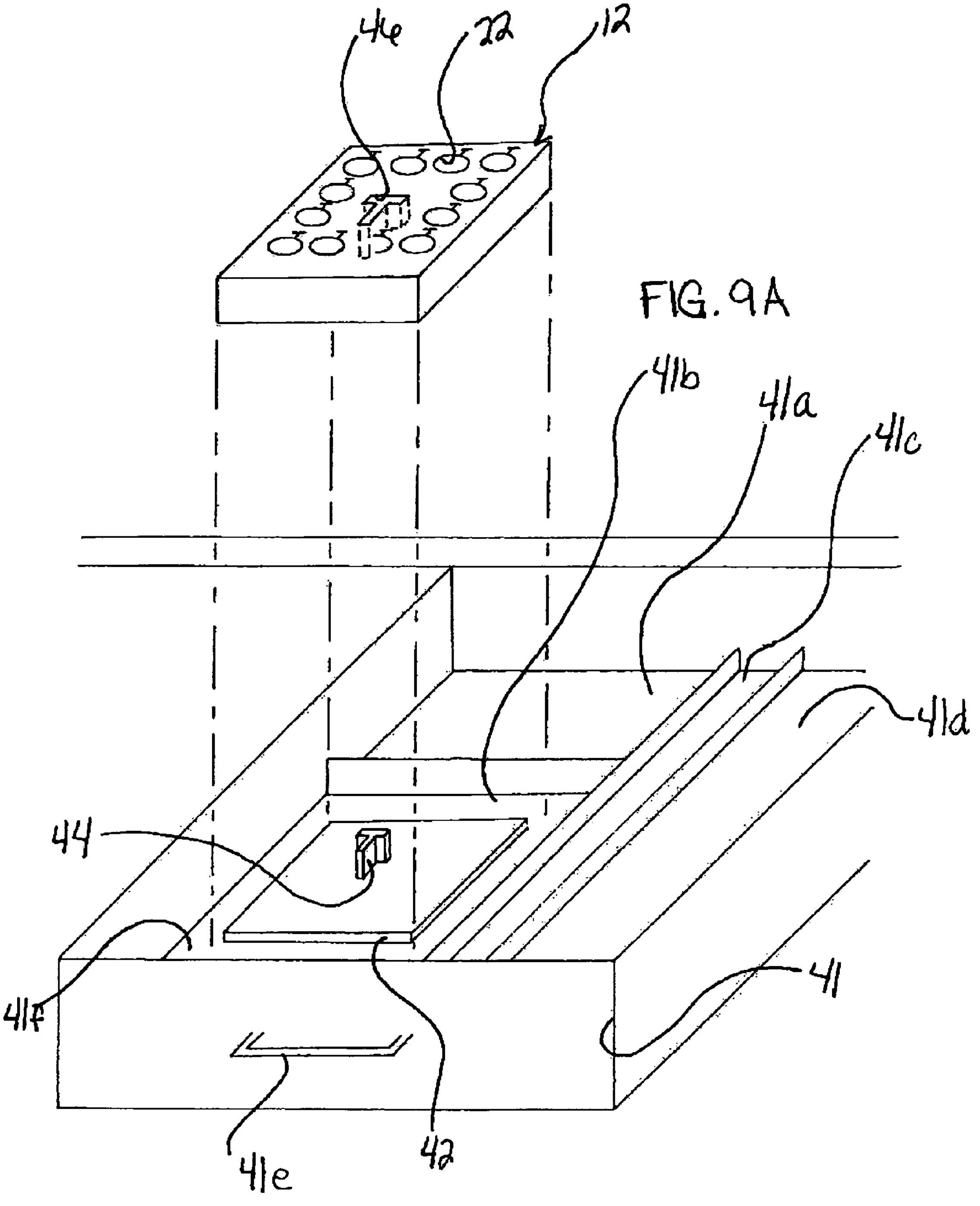
FIG. 9A is an exploded view of the tray and mounting plate of FIG. 9 with a cabinet drawer of one embodiment of the present invention.

Referring to FIGS. 9 and 9*a*, the drug storage and dispensing system of the present invention may also include drug storage drawer 41. Drug storage drawer 41 includes base 41*f*, multiple tray receiving compartments 41*a*-41*d* and handle 41*e*. Storage tray 12 may be configured to fit in one of compartments 41*a*-41*d* of drug storage drawer 41. Storage tray 12 may be adapted to fit existing drug storage drawers 41 and existing processors and automated delivering systems may be customized and re-programmed to recognize different drugs in compartments 41*a*-41*d*. Therefore, if new drugs are developed and/or demand for old drugs changes, drug drawer 41 may be re-organized and storage trays 12 re-designed.

Figure 10:
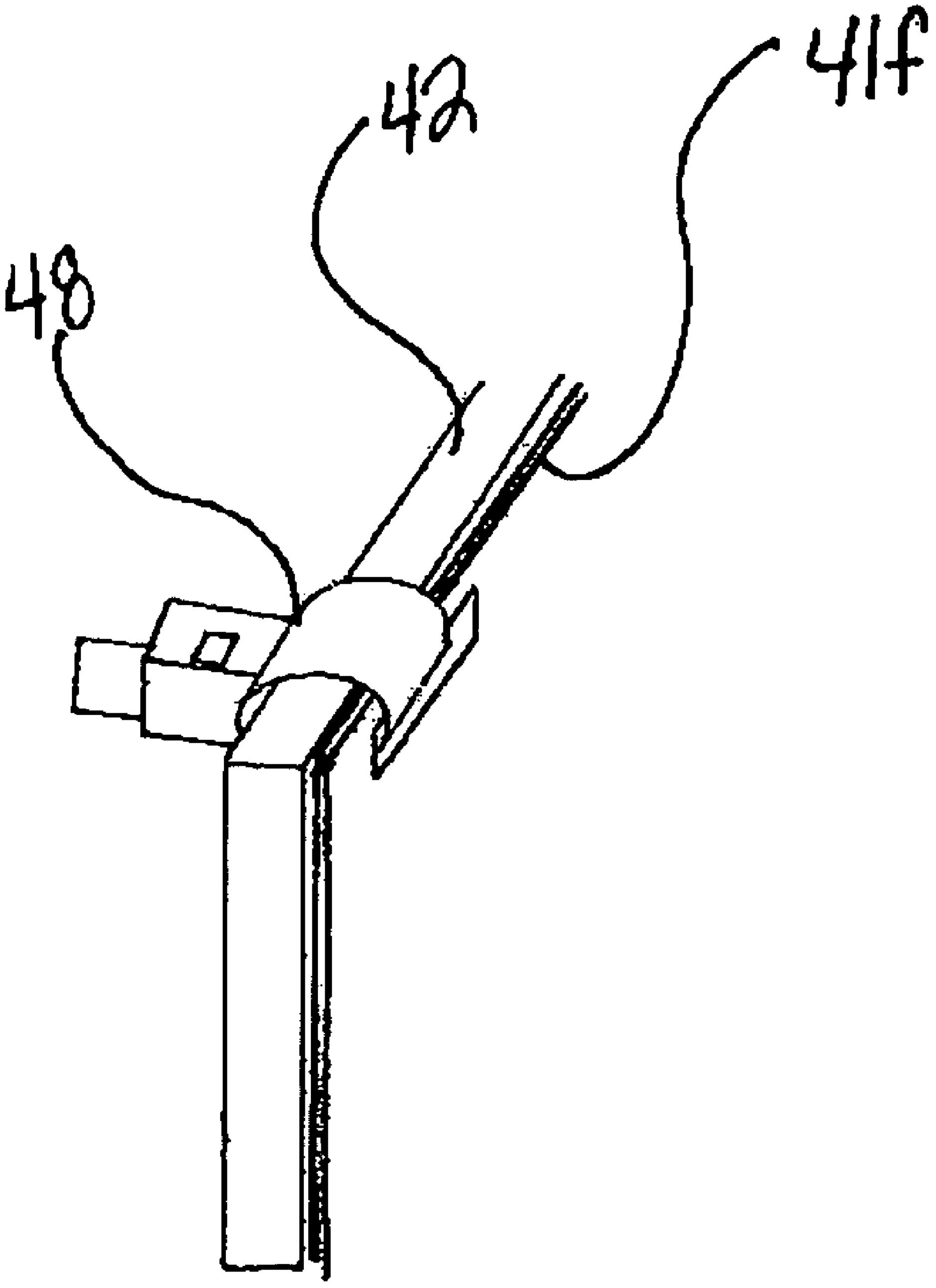
FIG. 10 is a perspective view of a mounting plate lock in accordance with one embodiment of the present invention.

However, since processors and automated drug delivery systems store the location of drugs, it may be beneficial to prevent one from easily and spontaneously relocating trays 12. On the other hand, when re-stocking, it may be beneficial to temporarily remove trays 12. Furthermore, the drug vials may be produced and shipped pre-loaded in new trays. Accordingly, rather than inserting vials into old trays, trays are removed and new ones pre-loaded with vials are put in place. In these cases, one must be sure the re-loaded or new tray is properly place. Mounting plate 41 may be provided. Mounting plate 42 is secured to base 41*f* in compartment 41F of drug drawer 41 via welding, adhesive, lock or other fixation means. Mounting plate 42 includes a first connector 44 having a shape corresponding to the drug to be stored in compartment 41F. Tray 12 is equipped with second connector 46, which is adapted to mate with first connector 44. In this particular embodiment, first connector 44 is in the form of a T-shaped protrusion, which second connector 46 is in the form of a T-shaped channel. First connector 44 mates with second connector 46 to selectively receive tray 12 in compartment 41F. As shown in FIG. 10 mounting plate 42 may be secured to base 41*f* of drawer 41 using lock 48.

The systems of the present invention help insure that the correct drug is stocked in the correct location in the drug storage area, thereby minimizing the chances that the wrong drug is selected and administered due to inaccurate stocking. The systems of the present invention also help insure that access to the drugs is selectively granted, thereby minimizing the chances that the wrong drug will be taken from the drug storage area.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A drug storage and dispensing system for storing drugs contained in a container, said storage system comprising:

a storage tray including at least one drug storage chamber, said at least one drug storage chamber being defined by a sidewall and configured to receive the drug container; and a drug identification key including at least one projection and at least one projection receiving opening configured to receive said at least one projection;

wherein said at least one projection is disposed on one of said sidewall of said storage chamber and the container, and said at least one projection receiving opening is formed in the other of said sidewall of said storage chamber and the container, said at least one projection and at least one opening having configurations complementary to one another, said complementary configurations corresponding to multiple features of the drug, said multiple features including a drug composition and a drug dosage, said at least one projection received in said at least one opening when the container is received in said storage chamber, said at least one projection including a first projection and second projection, and said at least one projection receiving opening including a first opening configured to receive said first projection and a second opening configured to receive said second projection, said first projection and first opening configured to correspond to said drug composition, said second projection and second opening configured to correspond to said drug dosage.

2. A drug storage and dispensing system for storing drugs contained in a container, said storage system comprising:

a storage tray including at least one drug storage chamber, said at least one drug storage chamber being defined by a sidewall and configured to receive the drug container; and a drug identification key including at least one projection and at least one projection receiving opening configured to receive said at least one projection;

wherein said at least one projection is disposed on one of said sidewall of said storage chamber and the container, and said at least one projection receiving opening is formed in the other of said sidewall of said storage chamber and the container, said at least one projection and at least one opening having configurations complementary to one another, said complementary configurations corresponding to at least one feature of the drug, said at least one projection received in said at least one opening when the container is received in said storage chamber;

wherein said tray includes a slot extending through said sidewall and intersecting each of said at least one drug storage chamber such that the container disposed in said chamber is viewable through said slot.

3. A drug storage and dispensing system for storing drugs contained in a container, said storage system comprising:

a storage tray including at least one drug storage chamber, said at least one drug storage chamber being defined by a sidewall and configured to receive the drug container;

a drug identification key including at least one projection and at least one projection receiving opening configured to receive said at least one projection, wherein said at least one projection is disposed on one of said sidewall of said storage chamber and the container, and said at least one projection receiving opening is formed in the other of said sidewall of said storage chamber and the container, said at least one projection and at least one opening having configurations complementary to one another, said complementary configurations corresponding to at least one feature of the drug, said at least one projection received in said at least one opening when the container is received in said storage chamber; and further comprising a drug cabinet and a plurality of said storage trays, said drug cabinet defining an interior storage space configured to hold said plurality of said storage trays.

4. The drug storage and dispensing system of claim 3 wherein said drug cabinet includes a mounting plate having a first connector, said storage tray having a second connector, said first connector adapted to couple with said second connector to thereby selectively couple said storage tray to said mounting plate.

5. The drug storage and dispensing system of claim 4 further comprising a tray lock, said tray lock locking said tray to said mounting plate.

6. The drug storage and dispensing system of claim 3 wherein said drug cabinet includes at least one locking door having a closed position enclosing said interior storage space and an open position allowing access to said interior storage space.

7. The drug storage and dispensing system of claim 6 further comprising a drug data and dispensing processor electronically coupled to said at least one locking door, said processor adapted to receive and process information, said processor moving door between said open and closed positions in response to said information.

8. The drug storage and dispensing system of claim 7 wherein said at least one projection and at least one projection receiving opening include complementary magnetic locks, said locks switchable between an activated state in which said at least one projection is locked within said at least one projection receiving opening and an inactivated state in which said at least one projection is releasably positioned within said at least one projection receiving opening, said processor selectively switching said magnetic locks between said activated and inactivated states.

9. A drug storage and dispensing system for storing drugs contained in a container, said storage system comprising:

a storage tray including at least one drug storage chamber, said at least one drug storage chamber being defined by a sidewall and configured to receive the drug container; and a drug identification key including at least one projection and at least one projection receiving opening configured to receive said at least one projection;

wherein said at least one projection is disposed on one of said sidewall of said storage chamber and the container, and said at least one projection receiving opening is formed in the other of said sidewall of said storage chamber and the container, said at least one projection and at least one opening having configurations complementary to one another, said complementary configurations corresponding to at least one feature of the drug, said at least one projection received in said at least one opening when the container is received in said storage chamber, wherein said at least one projection includes an identification surface, said identification surface having a bar code displayed thereon.

10. A drug storage and dispensing system for storing drugs, said storage system comprising:

a container for containing the drug;

a storage tray including at least one drug storage chamber, said at least one drug storage chamber being defined by a sidewall and configured to receive said container;

a drug identification key including at least one projection and at least one projection receiving opening configured to receive said at least one projection, wherein said at least one projection is disposed on one of said sidewall of said storage chamber and said container, and said at least one projection receiving opening is formed in the other of said sidewall of said storage chamber and said container, said at least one projection and at least one opening having configurations corresponding to at least one feature of the drug, said at least one projection received in said at least one opening when the container is received in said storage chamber; and a drug cabinet and a plurality of said storage trays, said drug cabinet defining an interior storage space configured to hold said plurality of said storage trays, said drug cabinet includes a mounting plate disposed in said interior storage space and having a first connector, said storage tray having a second connector, said first connector adapted to couple with said second connector to thereby selectively couple said storage tray to said mounting plate.

11. The drug storage and dispensing system of claim 10 further comprising a drug data and dispensing processor adapted to receive and process information, and wherein said drug cabinet includes at least one locking door having a closed position enclosing said interior storage space and an open position allowing access to said interior storage space, said processor is electronically coupled to said at least one locking door, said processor moving said door between said open and closed positions in response to said information.

12. The drug storage and dispensing system of claim 10 wherein said at least one projection and at least one projection receiving opening include complementary magnetic locks, said locks switchable between an activated state in which said at least one projection is locked within said at least one projection receiving opening and an inactivated state in which said at least one projection is releasably positioned within said at least one projection receiving opening, said processor selectively switching said magnetic locks between said activated and inactivated states.

13. A drug storage and dispensing system for storing drugs contained in a container, said storage system comprising:

a storage tray including a plurality of drug storage chambers, each of said drug storage chambers being defined by a sidewall and configured to receive the drug container;

a drug identification key including at least one projection adapted to extend from the container and at least one projection receiving opening including at least one opening formed in said sidewall of said drug storage chambers and configured to receive said at least one projection, wherein said at least one projection and at least one opening have configurations complementary to one another, said complementary configurations corresponding to at least one feature of the drug, said at least one projection received in said at least one opening when the container is received in said storage chamber; and a drug cabinet and a plurality of said storage trays, said drug cabinet defining an interior storage space configured to hold said plurality of said storage trays, said drug cabinet includes a mounting plate having a first connector, said storage tray having a second connector, said first connector adapted to couple with said second connector to thereby selectively couple said storage tray to said mounting plate.

14. The drug storage and dispensing system of claim 13 further comprising a drug data and dispensing processor adapted to receive and process information, and wherein said drug cabinet includes at least one locking door having a closed position enclosing said interior storage space and an open position allowing access to said interior storage space, said processor is electronically coupled to said at least one locking door, said processor moving said door between said open and closed positions in response to said information.

15. The drug storage and dispensing system of claim 14 wherein said at least one projection and at least one projection receiving opening include complementary magnetic locks, said locks switchable between an activated state in which said at least one projection is locked within said at least one projection receiving opening and an inactivated state in which said at least one projection is releasably positioned within said at least one projection receiving opening, said processor selectively switching said magnetic locks between said activated and inactivated states.

16. A drug storage and dispensing system for storing drugs contained in a container, said storage system comprising:

a storage tray including a plurality of drug storage chambers, each of said drug storage chambers being defined by a sidewall and configured to receive the drug container; and a drug identification key including at least one projection adapted to extend from the container and at least one projection receiving opening including at least one opening formed in said sidewall of said drug storage chambers and configured to receive said at least one projection, wherein said at least one projection and at least one opening have configurations complementary to one another, said complementary configurations corresponding to at least one feature of the drug, said at least one projection received in said at least one opening when the container is received in said storage chamber, and wherein said at least one projection includes an identification surface, said identification surface having a bar code displayed thereon.

* * * * *